Jan. 7, 1958
C. C. VEALE
2,819,382
METHODS OF AND APPARATUS FOR WELDING TAPES TOGETHER
TO FORM BI-METALLIC STOCK FOR ELECTRICAL CONTACTS
Filed April 5, 1955
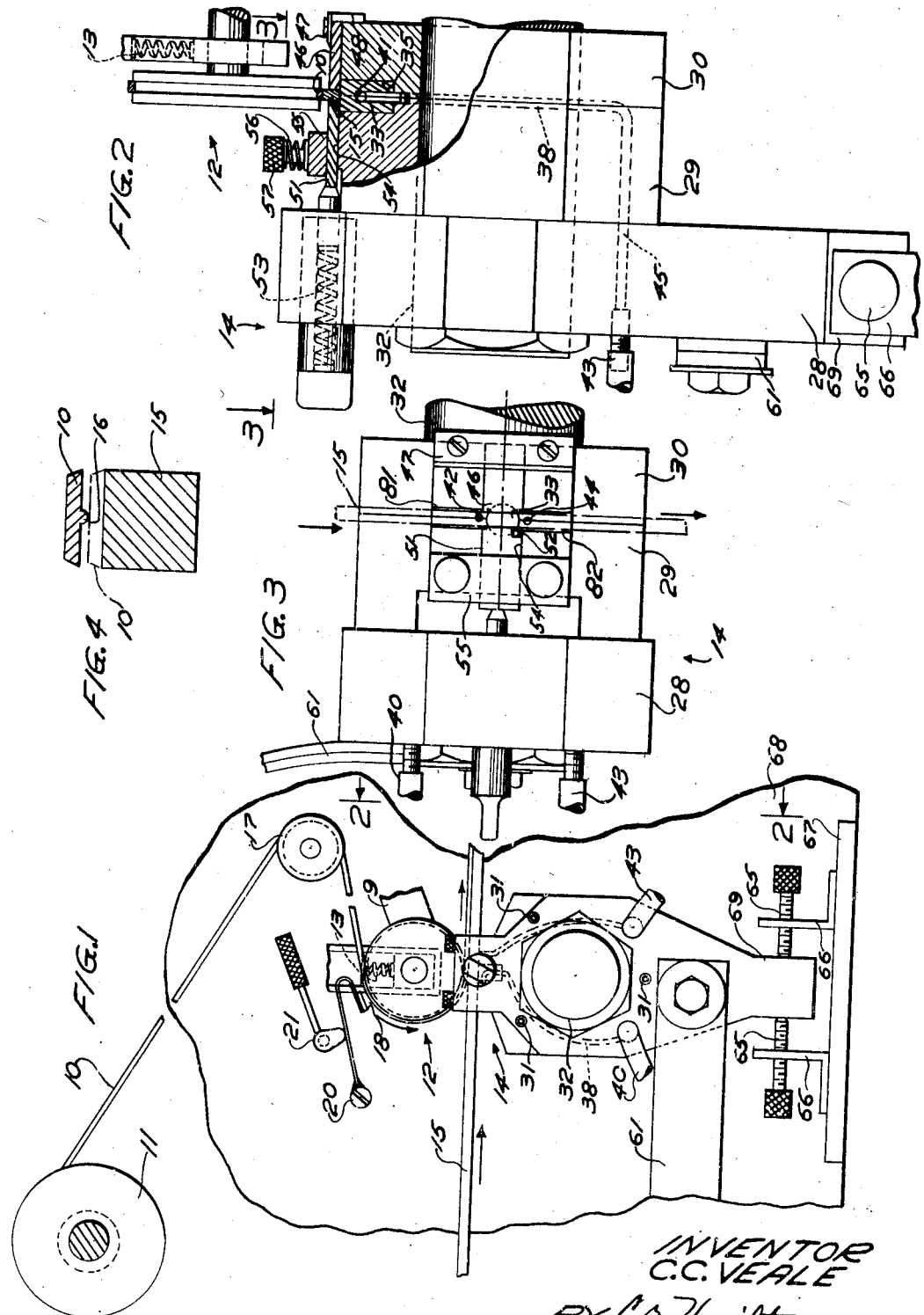
INVENTOR
C.C. VEALE
BY C.D. Hamilton
ATTORNEY

United States Patent Office 2,819,382
Patented Jan. 7, 1958

2,819,382

METHODS OF AND APPARATUS FOR WELDING TAPES TOGETHER TO FORM BI-METALLIC STOCK FOR ELECTRICAL CONTACTS

Charles C. Veale, West Chicago, Ill., assignor to Western Electric Company, Incorporated, New York, N. Y., a corporation of New York Application April 5, 1955, Serial No. 499,272

10 Claims. (Cl. 219—117)

This invention relates to methods of and apparatus for welding tapes together to form bi-metallic stock for electrical contacts, and more particularly to methods of and apparatus for welding precious metal caps to non-precious metal base members.

An object of the invention is to provide methods of and apparatus for welding a precious metal tape to a base metal tape without burning the electrodes.

Another object of the invention is to provide methods of and apparatus for welding tapes, of which at least one is stiff, together without a line contact between electrodes and the stiff tape.

A further object of the invention is to provide methods of and apparatus for welding the flexible precious metal tape to one face of a heavy, relatively rigid bar of base metal continuously without burning electrodes used in such welding.

In an apparatus for practicing a method illustrating certain features of the invention, a flexible precious metal tape is brought into contact with the face of a relatively heavy and inflexible tape of base metal, and the two tapes are advanced continuously together past opposed electrode elements, one of which contacts the heavy tape along a substantial portion of the path, and the other of which contacts the precious metal tape along a substantial portion of the path, whereby damagingly high current densities in the electrodes are avoided. Also, the tapes may be brought into contact with one another at a point along the path intermediate the portions of contact between the tapes and the electrodes so that the current density in the contact between portions of the tapes is high.

A complete understanding of the invention may be obtained from the following detailed description of a method and an apparatus forming specific embodiments thereof, when read in conjunction with the appended drawings, in which:

Fig. 1 is a fragmentary vertical section of an apparatus for practicing a method forming one embodiment of the invention;

Fig. 2 is an enlarged, fragmentary partially sectional side elevation of the apparatus taken along line 2—2 of Fig. 1;

Fig. 3 is an enlarged top plan view of a portion of the apparatus taken along line 3—3 of Fig. 2, and Fig. 4 is a section of tapes to be welded together by the apparatus shown in Fig. 1.

Referring now in detail to the drawings, there is shown therein a tape 10 of such a thickness as to be flexible and composed of a precious metal suitable for electrical contacts, such as, for example, palladium. The tape 10 is advanced from a supply reel 11 and travels almost 180° around a grooved roller electrode 12, which is contacted by a brush 9 and is urged continuously downwardly by a spring 13 toward a stationary electrode 14 contacting a relatively inflexible bar or tape 15 composed of copper and nickel or other suitable base metal suitable for electrical contact strip bases. A suitable metal for the bar may be one composed of about 70% copper and about 30% nickel. The tape 10 is welded to the bar 15 along a bead 16 which initially forms a line contact between the bar 15 and the tape 10 to concentrate current flow between these parts so that a very strong weld is formed between the tape 10 and the bar 15.

The tape 10 travels around a guide roller 17 and is pressed firmly against the roller 12 and braked by an insulating shoe 18 mounted on a spring arm 19 mounted pivotally on a screw 20 and urged toward the roller electrode 12 by a releasable cam 21. This braking of the tape 10 keeps it in close contact with the electrode 12 from the upper point of tangency thereof around the lefthand periphery of the electrode 12, as viewed in Fig. 1, to the lower point of tangency between the electrode 12 and the tape 10, which is an arc of substantially 180°. Current is supplied to the roller electrode 12 through brush 9 and flows to the tape 10 through the entire portion of contact between the tape 10 and the electrode 12, and, of course, gradually increases in current density to the point juxtaposed to the lower electrode 14.

The lower electrode 14 includes conductive copper blocks 28, 29 and 30 secured tightly together by cap screws 31, and mounted on an electrically insulated post or arbor 32 mounted on a fixed axis. The blocks 29 and 30 have a socket 35 formed therein for receiving an inverted cup 33 of tungsten carbide, which projects slightly above the upper faces of the blocks 29 and 30 for contacting the bar 15. The socket 35 is connected by a passage 38 to a supply line 40 supplying cooling water under pressure to the cup 33 which has an exhaust hole 41 leading to a nozzle aperture 42 in the blocks 29 and 30 for wetting the bottom of the bar 15 to act as a lubricant and coolant. A second cooling water supply pipe 43 supplies cooling water to a nozzle aperture 44 through a passage 45 in the blocks 28, 29 and 30. The aperture 44 directs the cooling water to a portion of the bar welded to a portion of the tape 10 which is still pressed by the electrode 12 tightly against the bar 15. This solidifies each portion of the weld while that portion is still under pressure between the electrodes 12 and 14 so that the weld is strong.

A tungsten carbide guide 46 is fixed by a clamp 47 securely to the upper face of the block 30 in a position abutting a stop 48 fastened to the block 30, and is in both electrical and heat-conducting contact with the block 30. A bar-locating-and-contacting electrode 51 having a notch 52 is urged continuously to the right, as viewed in Fig. 2, in a groove 54 in the block 29, by a compression spring 53, and serves to press the bar 15 against the electrode 46. The electrode 51 is composed of graphite impregnated porous copper and is urged into good contact with the block 29 by a conductive plate 55 urged downwardly by compression springs 56 mounted on posts 57 to hold the bar electrode 51 in good electrical and heat-conducting contact with the groove 54 in the copper mounting block 29.

A flexible conductor bar 61 is connected securely to the block 28 and is connected to the side of an alternating welding voltage source (not shown), the other side of which is connected to the brush 9 contacting the roller electrode 12 so that the electrodes 12 and 14 are at opposite potentials. The electrode 14 is rotatable on the arbor or post 32 and its position may be adjusted by adjustment screws 65 threadedly mounted on brackets 66 of electrical insulating material supported by a plate 67 projecting from a mounting frame 68. If necessary, the screws 65 may be actuated manually to turn the blocks 28, 29 and 30, through an arm 69, on the arbor 32 to bring the upper end of the cup 33 parallel to the bar 15 so that the bar 15 contacts the cup completely across the cup.

The cup 33, the guide plate 46 and the electrode 51 contact the bar 15 and are under good contact pressure as the bar 15 is slid therebetween so that good electrical contact is provided between elements 33, 46 and 51 and the bar 15. Each of these elements engages a substantial portion of the length of the bar 15 as the bar 15 is moved therethrough, and applies to the bar 15 substantially the potential of the conductor bar 61. As the blocks 29 and 30 and the cup 33 are cooled by the cooling water circulated therethrough, and serve to cool the guide 46 and the electrode 51 by contact therewith. The contacts of the cup 33, the guide 46 and the electrode 51 with the bar also serve to cool the portions of the bar 15 contacted thereby so that the only appreciable heated portion of the bar 15 is that in contact with the bead 16 and the tape 10 so that a very good weld is effected between the tapes 10 and the bar 15, the bead 16 melting so that the tape 10 is in face-to-face contact with the bar 15. Thus, burning of the guide 46, the electrode 51 and the cup 33, which are in contact with the bar 15, is prevented.

Since the tape 10 is in good electrical contact with a substantial portion of the periphery of the roller electrode 12 and the electrode 12 is turned, the current from the electrode 12 to the tape 10 is not concentrated at any one point on the electrode 12 so that it is not burned by the high current required for successfully welding the tape 10 to the bar 15, and at the precise point that the bead 16 is in contact with the bar 15, the current density is very high. Hence, the welding current is highly concentrated over a very short length of the bead 16 of the bar 15 while both the tape 10 and the bar 15 are contacted along substantial lengths thereof for the purpose of supplying a welding current to these elements. The point of tangency or point at which the bead 16 of the tape 10 comes into contact with the bar 15 is illustrated by a center-line 70 (Fig. 2), and the highly conductive electrode 51, which carries the major portion of current between the bar 15 and the electrode 14 is located with about two thirds of the electrode 12 on the advance or approach side of the point of tangency and only one third on the recess or leaving side of the point of tangency. This has the effect of causing the major portion of the current between the bar 15 and the electrode 14 to flow into the portion of the bar 15 not yet in contact with the tape 10 so that the current between the tape 10 and the bar 15 is concentrated as much as possible in the portions of the tape 10 and the bar 15 at which the welding is occuring.

The above-described method and apparatus serve to weld a relatively heavy and inflexible bar 15 and the flexible tape 10 together with high welding current and with rapid movement of the bar 15 and the tape 10 through the electrodes 12 and 14. Also, the cooling water from the aperture 44 is applied to the bar to cool the bar and the tape while they are pressed tightly together to provide a very strong weld. Also, the fact that the major portion of the electrode 51, which is the main current-carrying element of the lower electrode 14, contacts the bar 15 before the juncture or tangent point of the bar and the tape causes the major portion of the current to flow through the portions of the bar and the tape just being fused together rather than those portions thereof which have already been welded together. Grooves 81 and 82 are provided to drain the cooling water off the blocks 29 and 30, and channel the water around the bar 15 to increase the cooling effect of the water on the bar.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. The method of welding flexible tape to a rigid bar, which comprises advancing such a bar past an electrode in continuous sliding contact with the electrode, advancing a flexible tape into contact with the bar at a point beyond the initial contact of the bar and the electrode, continuously backing a substantial portion of the tape with an electrode movable with the tape as the tape comes into contact with the bar, and applying a potential difference to the electrodes.

2. The method of forming a bi-metallic tape, which comprises advancing a rigid bar along a predetermined path, continuously contacting the bar from a first point to a second point defining a predetermined portion of the path, bringing a flexible tape into contact with the bar at a point substantially nearer the second point at which the bar is contacted than the first point, contacting a substantial portion of the tape approaching engagement with the bar, and applying a welding potential to the contacted portions of the tape and the bar.

3. The method of forming bi-metallic tapes, which comprises advancing a pair of tapes into contact with one another at a predetermined point, applying a welding potential difference to the tapes at said point, pressing the portions of the tapes at said point and slightly beyond said point tightly together, and applying a coolant to the portions of the tapes beyond said point which are still pressed together.

4. An apparatus for welding tape, which comprises a shoe along which a bar may be slid in a predetermined direction, a roll around which a flexible tape may be guided for bringing the tape into tangential contact with the bar at a point between the ends of the shoe and closer to the end of the shoe at which the tape leaves than to the other end of the shoe, and means for applying a welding potential difference to the shoe and the roll.

5. An apparatus for forming bi-metallic tapes, which comprises a bar of electroconductive metal along which a rigid tape may be slid in contact therewith, an edge guide for engaging one side of the rigid tape, a graphite copper bar electrically connected to the bar and urged against the other side of the tape to urge the tape against the edge guide, a grooved roll of electroconductive material urged toward the bar for guiding a flexible tape of precious metal into contact with the non-flexible tape, and means for applying a welding potential across the roll and the bar.

6. An apparatus for forming bi-metallic tapes, which comprises a bar of electroconductive metal along which a rigid tape may be slid in contact therewith, a tungsten carbide edge guide for engaging one side of the rigid tape, a graphite copper bar urged against the other side of the tape to urge the tape against the tungsten carbide guide, a grooved roll of electroconductive material urged toward one end of the bar for guiding a flexible tape of precious metal into contact with the non-flexible tape, means for applying a welding potential across the roll and the bar, means for cooling the bar, and means for spraying cooling water on the rigid tape.

7. An apparatus for forming bi-metallic tapes, which comprises a copper block having cooling passages therein and along which a rigid tape may be slid in contact therewith, means mounting the block pivotally, means for pivotally adjusting the block, an edge guide on the top of the block for engaging one side of the rigid tape, a graphite copper electrode connected electrically to the block and urged against the other side of the tape for pressing the tape against the edge guide, a roll electrode urged toward the block for guiding a flexible tape of precious metal into contact with the non-flexible tape, means for applying a welding potential across the roll electrode and the block.

8. In an apparatus for welding a flexible tape to a moving rigid bar, a flat electrode having a recessed section for receiving the moving bar, a roller electrode for engaging and guiding the flexible tape into engagement with the bar, means for projecting a coolant onto the stock at points both before and after the point where the tape engages the bar.

9. An apparatus for welding a flexible tape to a moving flat rigid bar which comprises a cup-shaped electrode having a flat surface for engaging the bar, means for applying a coolant to the interior of the cup-shaped electrode, a roller electrode for guiding the flexible tape into engagement with the bar, and nozzle means communicating with the coolant applying means for projecting coolant onto the bar at points both before and after the point of juncture of the tape and bar.

10. An apparatus for welding a flexible tape to a moving flat rigid bar which comprises a first electrode having a flat engaging surface, a pivotal mounting for said flat electrode, means for adjusting said mounting to move said flat surface into full engagement with the underside of said bar, a roller electrode for guiding said flexible tape into engagement with the moving rigid bar, and means within the first electrode for applying a coolant through the flat surface to the underside of the bar.

References Cited in the file of this patent
UNITED STATES PATENTS

| | | |
|---|---|---|
| 2,280,111 | Widell | Apr. 21, 1942 |
| 2,481,087 | Crise | Sept. 6, 1949 |
| 2,644,879 | Schwester | July 7, 1953 |
| 2,655,584 | Lange et al. | Oct. 13, 1953 |

FOREIGN PATENTS

| | | |
|---|---|---|
| 3,336 | Great Britain | Mar. 28, 1891 |
| 25,209 | Denmark | Nov. 24, 1919 |